Aug. 20, 1940.                C. S. McCARTHY                2,212,375
                             CONTROL MECHANISM
                          Filed Sept. 30, 1937           2 Sheets-Sheet 1
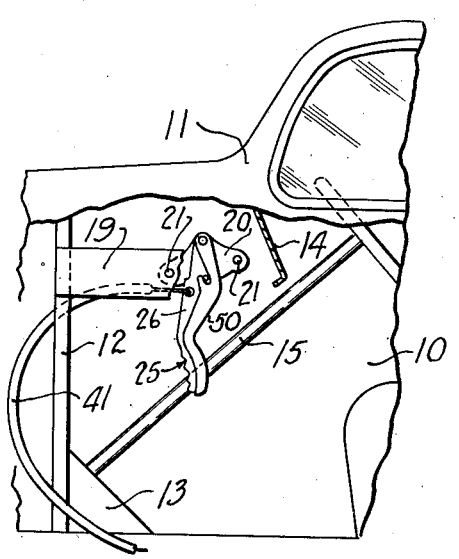
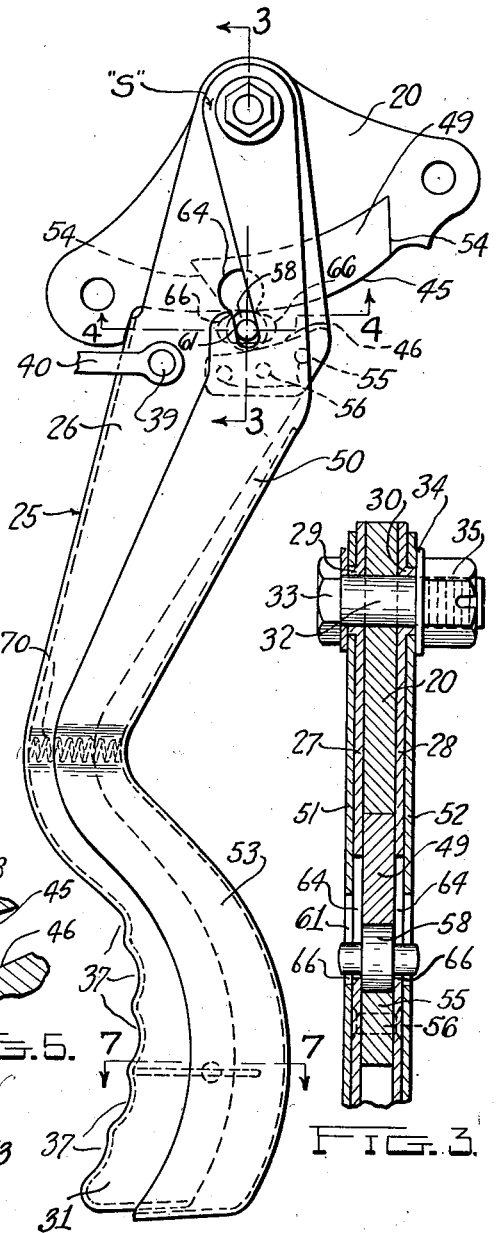
Inventor
Charles S. McCarthy
By Braselton, Whitcomb Davis
Attorneys Aug. 20, 1940.                C. S. McCARTHY                 2,212,375
                              CONTROL MECHANISM
                            Filed Sept. 30, 1937            2 Sheets-Sheet 2
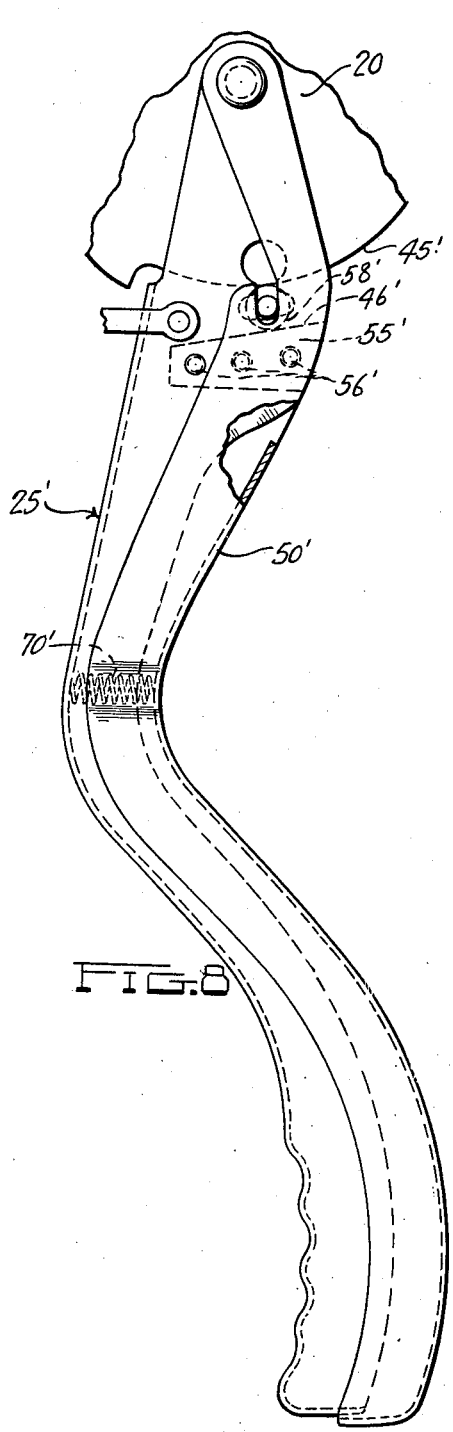
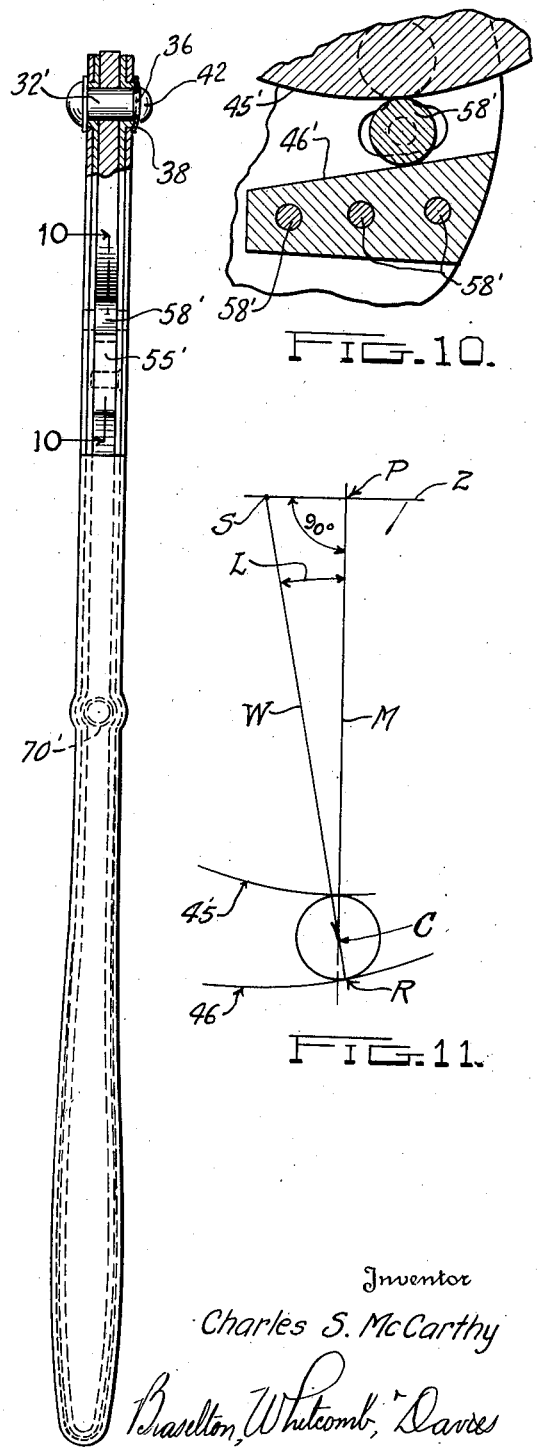
Inventor
Charles S. McCarthy
Baselton, Whitcomb, Davies
Attorneys.

Patented Aug. 20, 1940

2,212,375

UNITED STATES PATENT OFFICE 2,212,375

CONTROL MECHANISM

Charles S. McCarthy, Toledo, Ohio, assignor to The Logan Gear Company, Toledo, Ohio, a corporation of Ohio Application September 30, 1937, Serial No. 166,513

7 Claims. (Cl. 74—531)

This invention relates to mechanism control and more particularly to a lever mechanism for manipulating the brakes of automotive vehicles.

The invention embraces the provision of a lever mechanism particularly adapted to be mounted adjacent the dash board of the vehicle for convenience and ease of operation by the vehicle operator.

An object of the invention resides in the provision of a lever in which the major elements are formed from sheet metal enhancing the interchangeability of elements and materially decreasing the cost of the lever arrangement of this character.

Another object of the invention is the provision of a lever arrangement having a cylindrical or overrunning clutch mechanism for holding the lever in predetermined position wherein the parts do not have to be fabricated with a high degree of accuracy and yet provide a commercially practicable lever mechanism.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which:

Figure 1 is a fragmentary side elevational view of the forward portion of an automotive vehicle, a part of the body panel being broken away to illustrate a method of mounting the mechanism control arrangement of my invention;

Figure 2 is a side elevational view of one form of the mechanism control of my invention;

Figure 3 is a vertical detail sectional view taken substantially on the line 3—3 of Figure 2;

Figure 4 is a horizontal sectional view taken substantially on the line 4—4 of Figure 2;

Figure 5 is a detail sectional view taken substantially on the line 5—5 of Figure 4;

Figure 6 is a front elevational view of the grip portion of the lever and clutch actuator;

Figure 7 is a detail sectional view taken substantially on the line 7—7 of Figure 2;

Figure 8 is a side elevational view showing a modified form of my invention;

Figure 9 is a rear elevational view of the lever mechanism shown in Figure 8, the upper part being shown in section;

Figure 10 is a fragmentary detail sectional view taken substantially on the line 10—10 of Figure 9;

Figure 11 is a diagrammatic view of the upper portion of a lever member forming a part of the invention.

While I have illustrated the mechanism control of my invention utilized as a means for controlling the emergency brake control of automotive vehicles, it is to be understood that I contemplate the utilization of the invention in any type of mechanism where the control may have utility.

Referring to the drawings in detail, and especially to Figure 1, I have illustrated the forward portion 10 of a vehicle body of conventional design having a cowl portion 11, dash portion 12, toe board 13, instrument panel 14 and steering post or column 15. The mechanism control of my invention is particularly adapted to be mounted in such a manner that the same may be conveniently operated by the driver of the vehicle and yet be located in a position which will not impede nor handicap the vehicle operator. The control mechanism is preferably mounted adjacent the left side wall of the vehicle body as viewed from the driver's position and is mounted upon a bracket 19 secured to the dash and cowl frame construction, or other suitable portion of the vehicle. A support 20 is preferably carried by bracket 19 being secured to the latter by means of rivets 21 or other suitable securing means.

The mechanism control of my invention includes a lever or lever member 25 fabricated of sheet metal which has a body portion 26 of U-shaped configuration in cross section, the lever body terminating at its upper portion in spaced parallel walls or projections 27 and 28. Adjacent the upper end of the wall portions, the latter are provided with openings bounded by outwardly extending flanges 29 and 30 forming elongated bearing surfaces or journals to receive a pivot pin or shaft 32, the shaft 32 passing through an opening in the support 20 whereby the lever member is pivotally carried by the support. Pin 32 is provided with a head 33, the other end of the pin being threaded to receive a washer 34 and a nut 35 to retain the lever upon the pivot pin. The lever body terminates at its lower end in a grip portion 31 preferably of hollow or U-shaped configuration as shown in Figure 7, the forward contour of the grip portion being formed with spaced depressions 37, as particularly shown in Figure 2, forming a grip to conveniently fit the hand of the vehicle operator. The side walls of a U-shaped body portion of the lever are provided with aligned openings adapted to receive a clevis pin 39 which secures a clevis member 40 to the lever, the clevis being connected by means of a cable or other suitable means contained within a sheath 41 illustrated in Figure 1 for connecting the lever member with the brake mechanism.

The support 20 is provided with an element 49 having an arcuate clutching surface 45 concentric with the axis of the pivot pin 32 and formed as an edge wall thereof. The element 49 may be hardened to provide a suitable clutching surface 45 without the necessity of hardening the entire bracket or support 20, the member 49 being pressed or snugly fitted into an opening formed in the lower portion of bracket 20, the end walls 54 of the member 49 being preferably convergent in order that the element 49 may at all times be fixedly positioned in the bracket 20. It is to be understood that the clutching surface 45 may, if desired, without departing from the scope of the invention, be formed directly upon the bracket 20 as illustrated in the form of the invention shown in Figure 8 and the entire bracket suitably hardened to provide a hard clutching surface. Also pivoted for rotation or oscillation about the axis of shaft 32 is a U-shaped clutch actuating member 50 having its major portion of U-shaped configuration in cross section and terminating at its upper portion in parallel side walls 51 and 52 which are journalled upon the annular flanges 29 and 30 formed in the lever member side walls. In this manner the clutch actuator 50 is pivoted for rotation about the axis of the lever support. The lower portion of the clutch actuating member is preferably of U-shaped configuration in cross section as illustrated in Figure 7 and forms a hand grip portion 53, the side walls of the grip portion 53 preferably overlapping the side walls of the grip portion of the lever member as especially illustrated in Figure 7.

Positioned intermediate the side walls 27 and 28 of the lever member is a block or member 55 which is fixedly secured to the lever member by means as particularly shown in Figures 2 and 3 of rivets 56 or other suitable means. The block 55 is provided with an arcuate surface 46, which is generated about a center different from the axis of the lever support in shaft 32.

As illustrated in Figure 2, the arcuate surface 45 is generated about the axis of the lever support while the surface 46 is generated about a point S spaced from the axis of the lever support so that the surface 46 forms with surface 45 a wedging angle as particularly shown in Figure 5.

Figure 11 illustrates diagrammatically a practical method for determining the proper relationship between the relative stationary clutch surface 45 and the movable clutch surface 46 providing a satisfactory angle whereby the lever can be locked in any adjusted position by means of a clutch member or roller. I have found that an angle of approximately 11° serves the locking purpose very effectively. In order to determine the center of generation of the movable clutch surface 46 when the clutching surface 45 is generated about the point P or on the axis of pivotal movement of the lever, the following provides a simple method for making such determination: The projection of radius M to include the radius of the roller will result in point C, viz., the center of the roller, and projecting a line W through point C at an angle L of approximately 11° with line M, will give at the point of interception of line W with a line Z perpendicular to the line M at point P, the point S about which the clutch surface 46 may be generated, the line SR being the radius of the surface 46, so that in all positions of the lever mechanism the locking angle so determined will be effective to hold the lever through the medium of the clutch roller and clutch surfaces in brake setting position. However, other locking angles may be employed if so desired and point S may be determined by the method hereinbefore set forth using angles other than 11° and the clutch surface 46 generated to any desired locking angle. In order to provide a lever mechanism wherein the accuracy of the parts may be reduced to a minimum, it is desirable to have as great a wedging angle as is permissible and yet be sufficient for the roller or clutch 58 to be frictionally retained between the arcuate surfaces.

In the embodiment illustrated the clutch member or roller 58 is provided with axially arranged tenons 59 which fit in slots or recessions 61 making an operative connection between the clutch roller and the clutch actuating member 50. By this connection, a movement of the grip portion 53 of the clutch actuator 50 will carry with it the clutch roller 58 to clutch releasing position in order to effect a release of the braking mechanism. The parallel side wall portions of the lever 25 above the normal position of the clutch roller 58 are provided with circular openings 64 which terminate in transverse slot like configurations 66, while the edges of the slots 61 in the clutch actuator 50 closely fit the peripheral portions of the tenons 59 so as to provide a close connection between the clutch actuator 50 and the clutch roller 58, this arrangement being clearly shown in Figure 4. The diameters of the slots 64 are slightly larger than the diameter of the clutch roller 58 to permit the assembling of the clutch roller in its proper position.

Interposed between the bight portions of the U-shaped configuration of both the lever member 25 and the clutch actuator 50 is a resilient means or expansive coil spring 70 which is maintained in place by an embossed portion 71 of the lever 25. The spring 70 serves to urge the clutch actuator 50 in a counter-clockwise direction with respect to the lever 25, and the side walls of the recesses 61 being in contact with the tenons 59 of the clutch roller thus urge the clutch roller toward clutching position, that is, in engagement with the clutching surfaces 45 and 46 as especially shown in Figure 5.

The grip portions of the lever and clutch actuating members in the embodiment illustrated are preferably expanded to greater width than the body portion of the two members as illustrated in Figure 6 to properly accommodate the hand of the operator.

As illustrated in Figures 2 and 7, the side walls of the grip portion of the lever member may be provided with aligned openings 72 and positioned within the hollow interior of the grip portion is a hairpin-like spring 73 having outwardly extending projections 74 which project through the openings 72 and engage the inner side wall portions of the clutch actuator grip portion 53 serving as an anti-rattling means between the lever and clutch actuating members.

In assembling the elements of the control mechanism, the clutch roller 58 is first inserted through the large openings 64 in the lever after which the roller is moved downwardly until the tenons 59 are in the slots or openings 66. The coil spring 70 is then inserted in the lever member in the embossed portion 71 and the clutch actuator fitted over the lever member with the tenons 59 of the clutch roller extending into the recesses 61 in the clutch actuator. The openings in the upper ends of the lever member are then brought into alignment with the openings in the support 20 after which the pin or bolt 32 may be inserted and the nut 35 applied to the bolt to hold the parts in assembled relation.

In the operation of this form of the invention, the braking mechanism is connected through the medium of clevis 40 and pin 39 to the lever member and when it is desired to effect the setting of the brakes, the operator of the vehicle grasps the grip portion 37 and rotates the lever about the pin 32 in a counter-clockwise direction, and under the influence of the coil spring 70 urging the clutch actuating member away from the lever member, the latter carries the clutch roller 58 into instantaneous wedging engagement with the surfaces 45 and 46. Thus, as soon as the operator releases his grasp upon the portion 37 of the lever, the clutch roller is in wedging engagement with the clutching surfaces and normally prevents the lever member from returning thus holding the brakes in "set" position. When it is desired to release the braking mechanism, the operator grasps the grip portions 37 and 53 of the lever member and clutch actuator respectively and bringing them together against the tension of the coil spring 70, clutch actuator 50 carries the roller 58 in a clockwise direction out of wedging engagement with the clutch surfaces 45 and 46 so that the lever is thus released and may be moved about the pivot 32 to release the braking mechanism.

In the form of the invention shown in Figures 8 through 10 inclusive, the lever member 25' and clutch actuator 50' are substantially of the same construction as the lever member 25 and the clutch actuator 50 hereinbefore described. The clutch block 55' which is secured by means of rivets 56' to the lever member between the side walls thereof is provided with a clutch engaging surface 46' uniplanar in character which is of proper angularity to form with the clutch engaging surface 45' a wedge configuration for cooperation with the clutch roller 58'. As has been stated in connection with the other forms of the invention hereinbefore described, approximately an 11° angle is effective to produce a locking angle. In this form of the invention the surface 46' is arranged at substantially an 11° angle with respect to a tangent passing through the point of contact of clutch roller 58' on surface 45' with the distance between the clutch surface 45' and the uniplanar surface 46' being slightly less than the diameter of the clutch roller at the critical or locking position.

As particularly illustrated in Figure 9, the pin 32' forming the pivotal support of the lever member and clutch actuator upon the bracket 20 is provided with a reduced tenon 36 which receives a cup-shaped spring like washer 38, the pin 32' being afterwards riveted or headed as at 42 to hold the parts in place and to distort slightly the spring washer 38, the latter exerting a resilient pressure upon the clutch actuator to hold the projections of the latter in engagement with the side walls of the lever member and the latter in turn in close engagement with the side walls of the bracket 20 to eliminate rattling which may arise by reason of the vibration of the structure when the same is installed in an automotive vehicle. In this form of the invention, the coil spring 70' urging the clutch actuator 50' toward counter-clockwise position carries the clutch roller 58' toward wedging position as the lever member is moved counter-clockwise to "brake setting" position. When it is desired to release the brake mechanism, the grip portion of the clutch actuator is moved toward the grip portion of the lever member causing the clutch actuator to carry the roller 58' out of wedging engagement with the clutching surfaces, after which the lever mechanism may be moved clockwise to effect a release of the braking mechanism.

It is apparent that within the scope of the invention, modifications and different arrangements may be made other than is herein disclosed, and the present disclosure is illustrative merely, the invention comprehending all variations thereof.

What I claim is:

1. In combination, mechanism control including a support having a clutching surface on a depending edge thereof; a lever member pivotally secured to said support; a clutching surface associated with said lever member and positioned beneath said support, the clutching surfaces being arranged with respect to each other to form a wedging angle; a clutch member interposed between said clutching surfaces; a clutch actuator pivotally associated with said lever member; said clutch actuator having operative connection with said clutch member to swing the latter in either direction by movement of said clutch actuator; and spring means for urging said clutch member toward wedging position between said clutching surfaces.

2. In combination, mechanism control including a support having a clutching surface on a depending edge thereof; a lever member of U-shaped configuration pivotally secured to said support; a clutching surface associated with said lever member and positioned beneath said support, said clutching surfaces being generated as radii about different centers; a clutch roller interposed between said clutching surfaces; a clutch actuator pivotally associated with said lever member; connecting means between said clutch actuator and said clutch roller; and spring means cooperating with said clutch actuator for urging said clutch roller toward wedging position between said clutching surfaces, the side walls of said lever member being pressed outwardly to receive and retain said spring means.

3. In combination, mechanism control including a support having a clutching surface on a depending edge thereof; a lever member pivotally secured to said support; a clutching surface associated with said lever member and positioned beneath said support; a clutch actuator pivotally associated with said support about the same pivotal center as the lever member; a slot in said lever member; a clutch roller adapted to be received in said slot, said clutching surfaces being angularly arranged with respect to each other to form a locking angle; said clutch roller having a tenon cooperating with said actuator whereby said clutch roller may be moved relative to said lever member by said clutch actuator; and resilient means associated with said clutch actuator for urging said clutch roller toward wedging position.

4. In combination, mechanism control including a support having a uniplanar portion, said uniplanar portion having a clutching surface associated therewith; a lever member formed of sheet metal having spaced parallel portions adapted to straddle the uniplanar portion of said support, the parallel portions of said lever having aligned openings; a shaft projecting through said openings for pivotally connecting said lever member to said support; a block fixedly secured between the side walls of said lever member and below the uniplanar portion of said support, said block having a clutching surface angularly arranged with respect to the clutching surface associated with said support; a clutch actuator having spaced side wall portions coextensively arranged with the upper portion of said lever member, said clutch actuator being pivotally articulated about the axis of said shaft; said clutch actuator having slots formed in the side walls thereof; a clutch roller having tenon portions projecting in said slots whereby movement of said clutch actuator effects a release of the lever member; and spring means associated with said clutch actuator for urging said clutch roller toward clutching position.

5. In combination, mechanism control including a support having a uniplanar portion, said uniplanar portion having a clutching surface associated therewith; a lever member formed of sheet metal having spaced parallel portions adapted to straddle the uniplanar portion of said support, the parallel portions of said lever having flanged aligned openings; a stub shaft projecting through said openings for pivotally connecting said lever member to said support; a block fixedly secured between the side walls of said lever member and below the uniplanar portion of said support, said block having a clutching surface angularly arranged with respect to the clutching surface associated with said support; a clutch actuator formed of sheet metal and having spaced side wall portions coextensively arranged with the upper portion of said lever member, the projecting portions of said clutch actuator having openings to receive the flange portions of said lever member side walls whereby said clutch actuator is pivoted about the pivotal axis of said lever member, said clutch actuator having slots formed in the side walls thereof; a clutch roller having tenon portions projecting in said slots whereby movement of said clutch actuator effects a release of the lever member; and spring means associated with said clutch actuator for urging said clutch roller toward clutching position.

6. In combination, mechanism control including a support having a clutching surface; a lever member formed of sheet metal pivotally secured to said support; a clutching surface associated with said lever member and positioned beneath said support, the clutching surfaces being angularly arranged with respect to each other; a clutch member interposed between said clutching surfaces and adapted to hold said lever member in adjusted position; a clutch actuator formed of sheet metal pivotally associated with said lever member, said clutch actuator having a U-shaped portion embracing a portion of said lever member; spring means cooperating between the lever member and clutch actuator for urging the clutch member toward locking position between said clutching surfaces; and an anti-rattle device including spring means carried by said lever member and engageable with the side walls of said clutch actuator for restricting lateral movement between said lever member and clutch actuator.

7. In combination, mechanism control including a support; an arcuate clutching surface associated with said support; a lever member formed of sheet metal pivotally connected to said support; said lever member having spaced side walls formed with aligned laterally projecting flanges; a clutching surface associated with the lever member and eccentrically arranged with respect to the clutching surface associated with the support; clutch means interposed between said clutching surfaces; a clutch actuator journalled for pivotal movement upon the laterally projecting flanges on said lever member and having operative connection with said clutch means; and resilient means for normally urging said clutch means into engagement with the clutching surfaces.

CHARLES S. McCARTHY.